US009001044B2

(12) United States Patent
Shin et al.

(10) Patent No.: US 9,001,044 B2
(45) Date of Patent: Apr. 7, 2015

(54) METHOD FOR INPUTTING USER COMMAND AND VIDEO APPARATUS EMPLOYING THE SAME

(75) Inventors: Chang-beom Shin, Seoul (KR); O-jae Kwon, Seoul (KR); Han-chul Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

(21) Appl. No.: 12/105,535

(22) Filed: Apr. 18, 2008

(65) Prior Publication Data

US 2009/0079696 A1 Mar. 26, 2009

(30) Foreign Application Priority Data

Sep. 20, 2007 (KR) .................................. 2007-96087

(51) Int. Cl.
- *G06F 3/02* (2006.01)
- *H04N 5/44* (2011.01)
- *G06F 3/0488* (2013.01)
- *G06F 3/0489* (2013.01)
- *H04N 5/445* (2011.01)
- *H04N 21/422* (2011.01)

(52) U.S. Cl.
CPC .......... *H04N 5/4403* (2013.01); *G06F 3/04886* (2013.01); *G06F 3/0489* (2013.01); *H04N 5/44591* (2013.01); *H04N 21/42222* (2013.01); *H04N 21/42228* (2013.01); *H04N 2005/4441* (2013.01)

(58) Field of Classification Search
USPC .............. 345/156, 169, 172; 348/734; 341/22
See application file for complete search history.

(56) References Cited

U.S. PATENT DOCUMENTS

| 5,796,388 A | 8/1998 | Yasuhara et al. |
| 6,292,172 B1 * | 9/2001 | Makhlouf ..................... 345/157 |
| 6,731,227 B2 | 5/2004 | Horie |
| 7,245,291 B2 * | 7/2007 | Sharif et al. .................. 345/172 |
| 7,561,072 B2 * | 7/2009 | Pham ............................. 341/23 |
| 2001/0005454 A1 * | 6/2001 | Nishino et al. ............... 396/287 |
| 2002/0049978 A1 * | 4/2002 | Rodriguez et al. ............. 725/86 |

(Continued)

FOREIGN PATENT DOCUMENTS

| CN | 1302152 A | 7/2001 |
| EP | 1764986 A1 * | 3/2007 |

(Continued)

OTHER PUBLICATIONS

Search Report and Written Opinion dated Jun. 30, 2008, issued from ISA with respect to International Application No. PCT/KR2008/001502.

*Primary Examiner* — Amare Mengistu
*Assistant Examiner* — Stacy Khoo
(74) *Attorney, Agent, or Firm* — Jefferson IP Law, LLP

(57) ABSTRACT

A method of inputting a user command includes displaying a navigation window including letter key symbols corresponding to keys on a manipulator. If a first user command as to a specific key on the manipulator is input, a specific letter key symbol on the navigation window corresponding to the specific key is activated, and if a second user command as to the specific key is input, the letter corresponding to the activated specific letter key symbol is input. Accordingly, even if the manipulator is separated from the display on which a result of the manipulator is displayed, the user can input a user command by looking at the display only.

22 Claims, 13 Drawing Sheets

(56) References Cited

U.S. PATENT DOCUMENTS

| | | |
|---|---|---|
| 2002/0077143 A1 | 6/2002 | Sharif et al. |
| 2002/0085128 A1* | 7/2002 | Stefanik ................. 348/734 |
| 2004/0263696 A1* | 12/2004 | Rogers .................. 348/734 |
| 2005/0162569 A1 | 7/2005 | Fairhurst et al. |
| 2005/0185788 A1* | 8/2005 | Daw ..................... 379/369 |
| 2005/0248527 A1* | 11/2005 | Scott .................... 345/156 |
| 2006/0082540 A1* | 4/2006 | Prior .................... 345/156 |
| 2007/0036363 A1* | 2/2007 | Hollemans et al. ........ 381/59 |
| 2007/0080846 A1* | 4/2007 | Stefanik ................. 341/176 |
| 2007/0080940 A1 | 4/2007 | Aoki et al. |
| 2007/0176896 A1 | 8/2007 | Gritton et al. |
| 2008/0062134 A1* | 3/2008 | Duarte et al. ............ 345/169 |
| 2009/0007001 A1* | 1/2009 | Morin et al. ............. 715/773 |
| 2009/0207134 A1* | 8/2009 | Spilo .................... 345/158 |

FOREIGN PATENT DOCUMENTS

| | | |
|---|---|---|
| JP | 2005-286835 A | 10/2005 |
| KR | 1999-864 | 1/1999 |
| KR | 2004-8164 | 1/2004 |

* cited by examiner

FIG. 5A
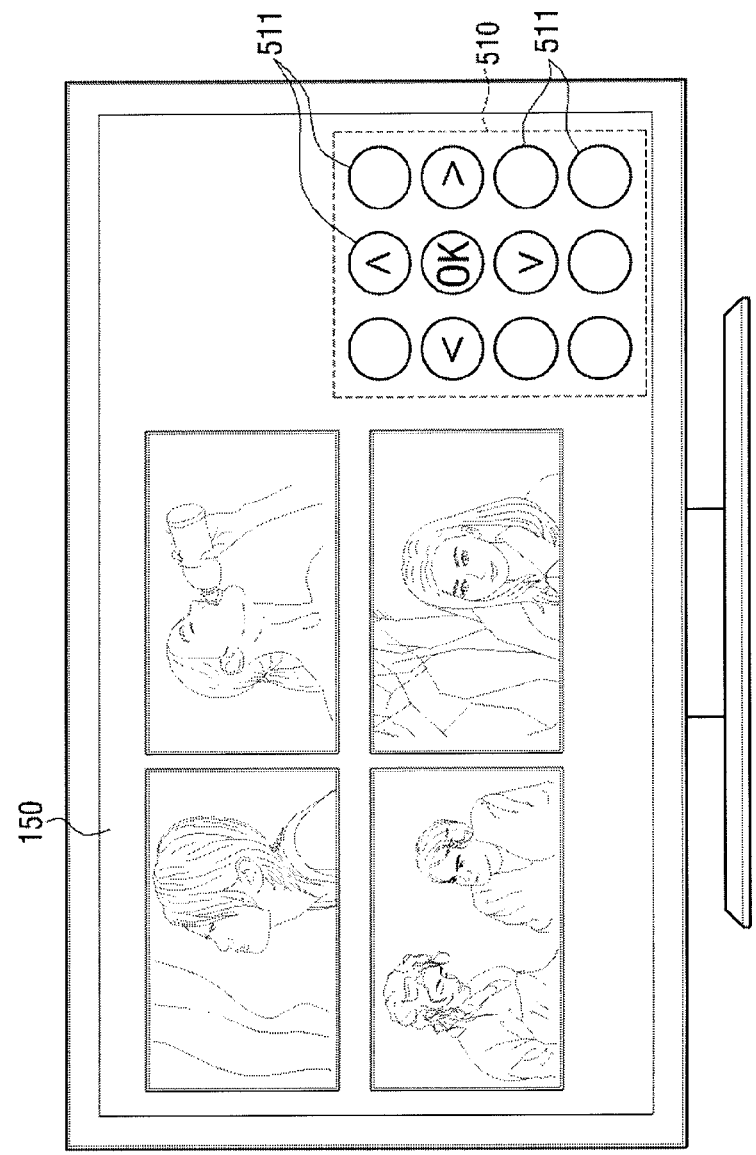
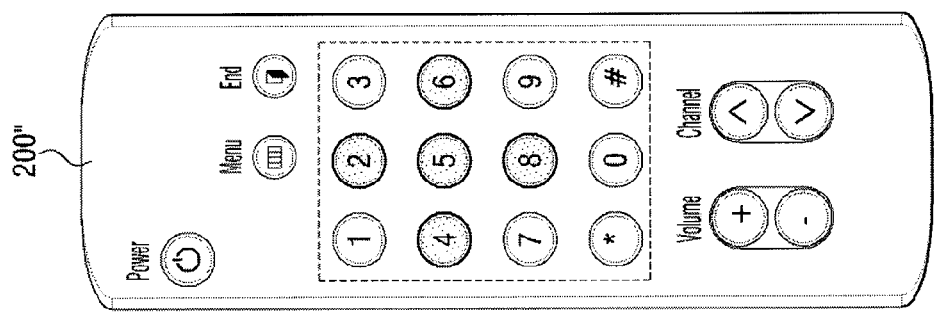

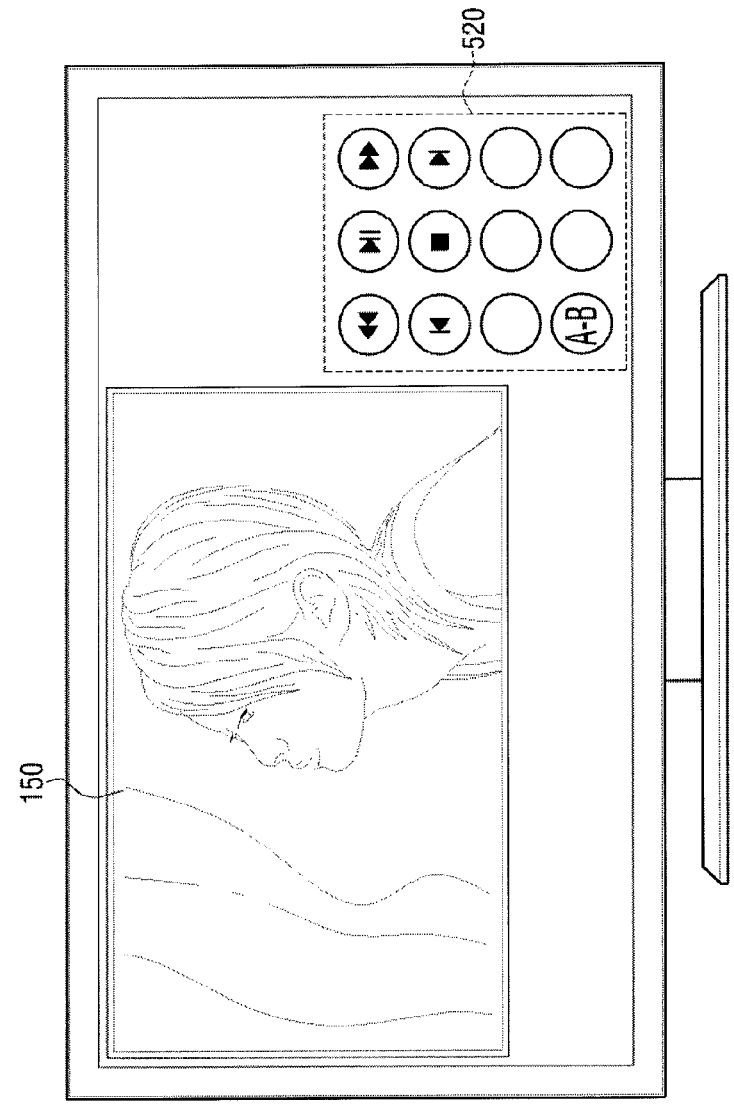
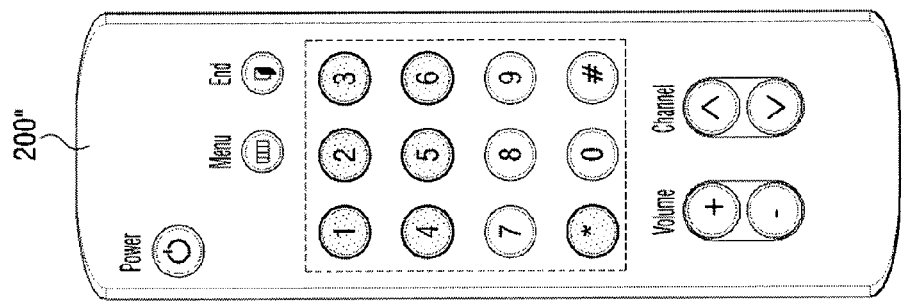
FIG. 5B

FIG. 5C
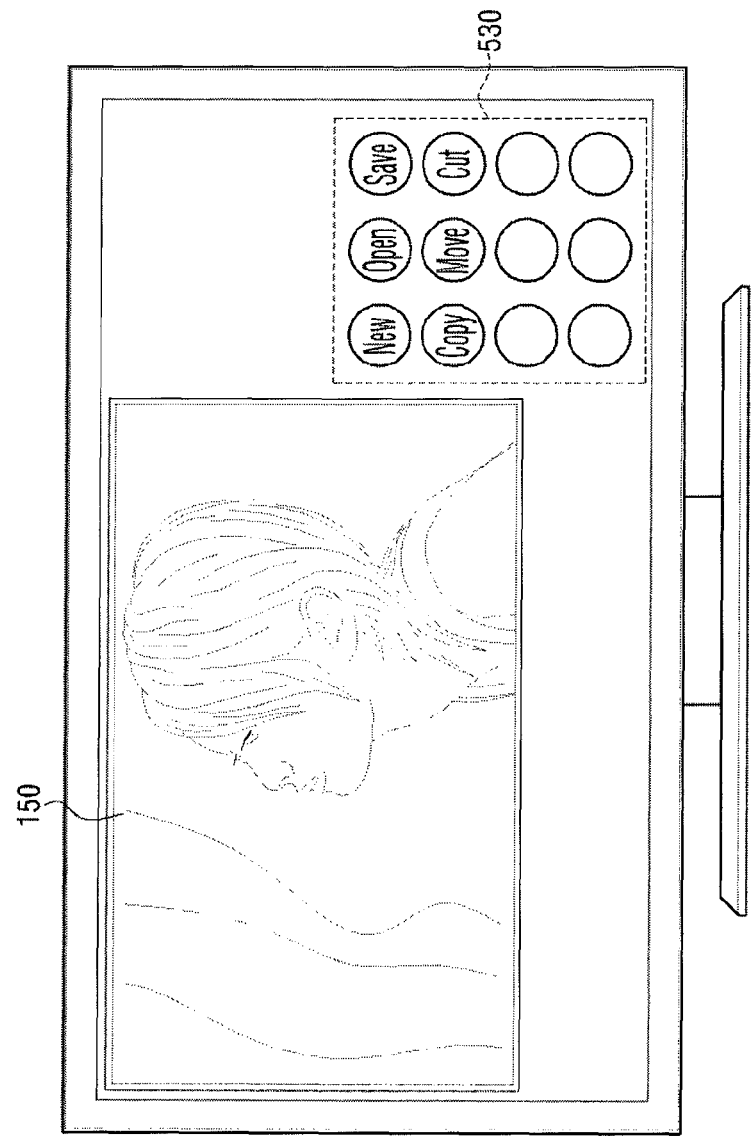
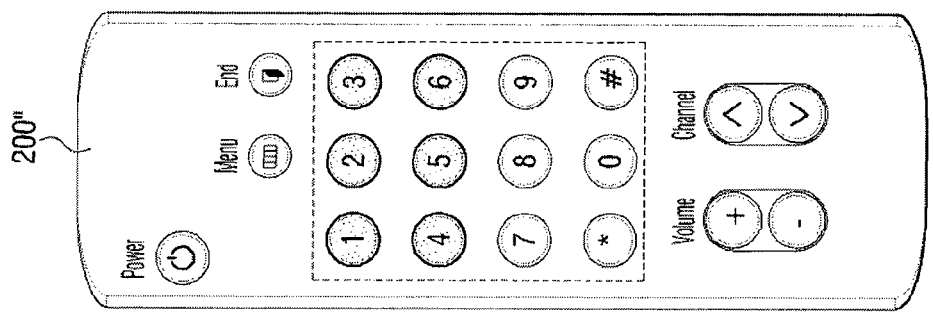

FIG. 5D
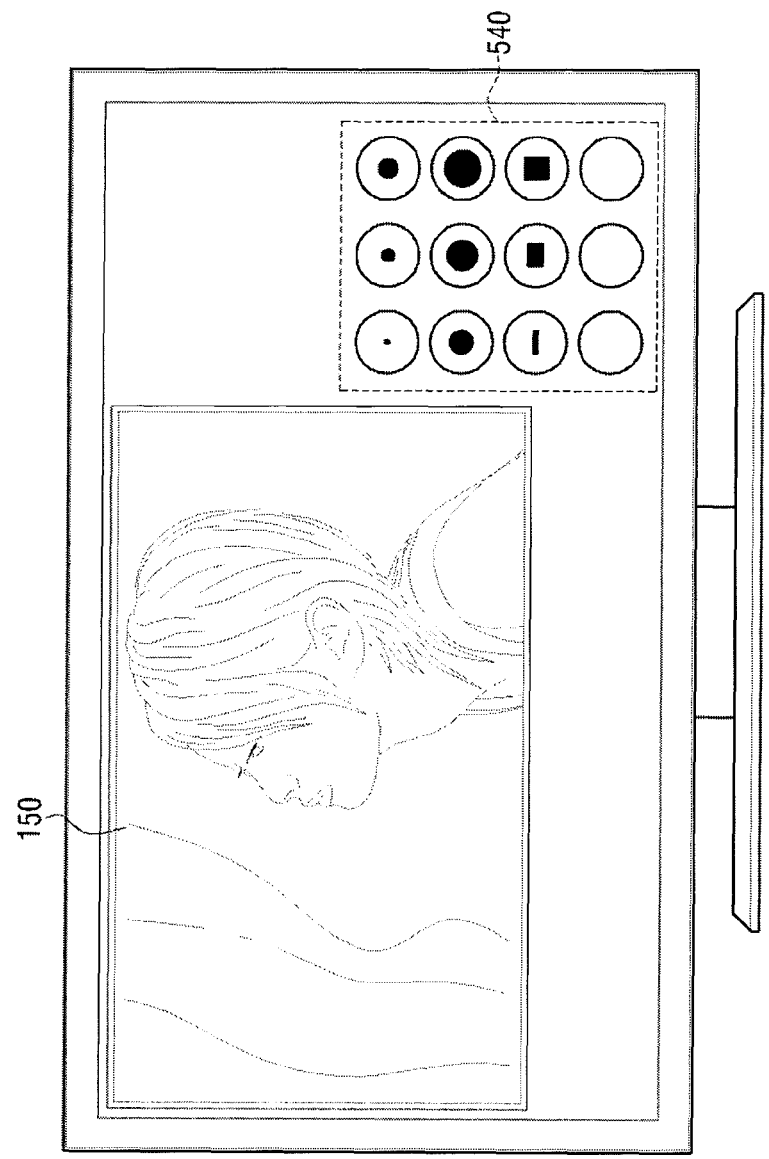
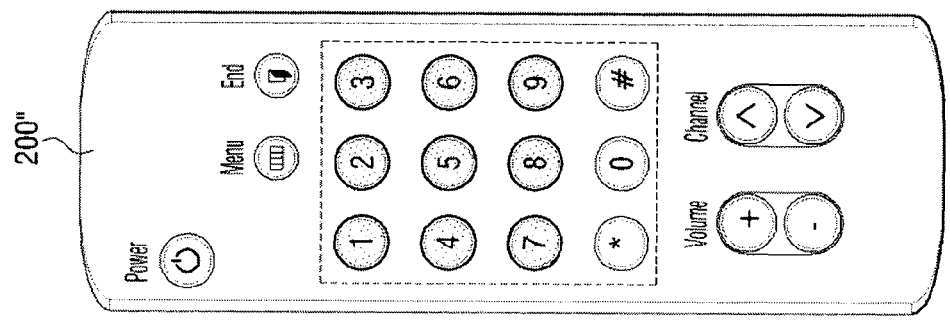

FIG. 5E
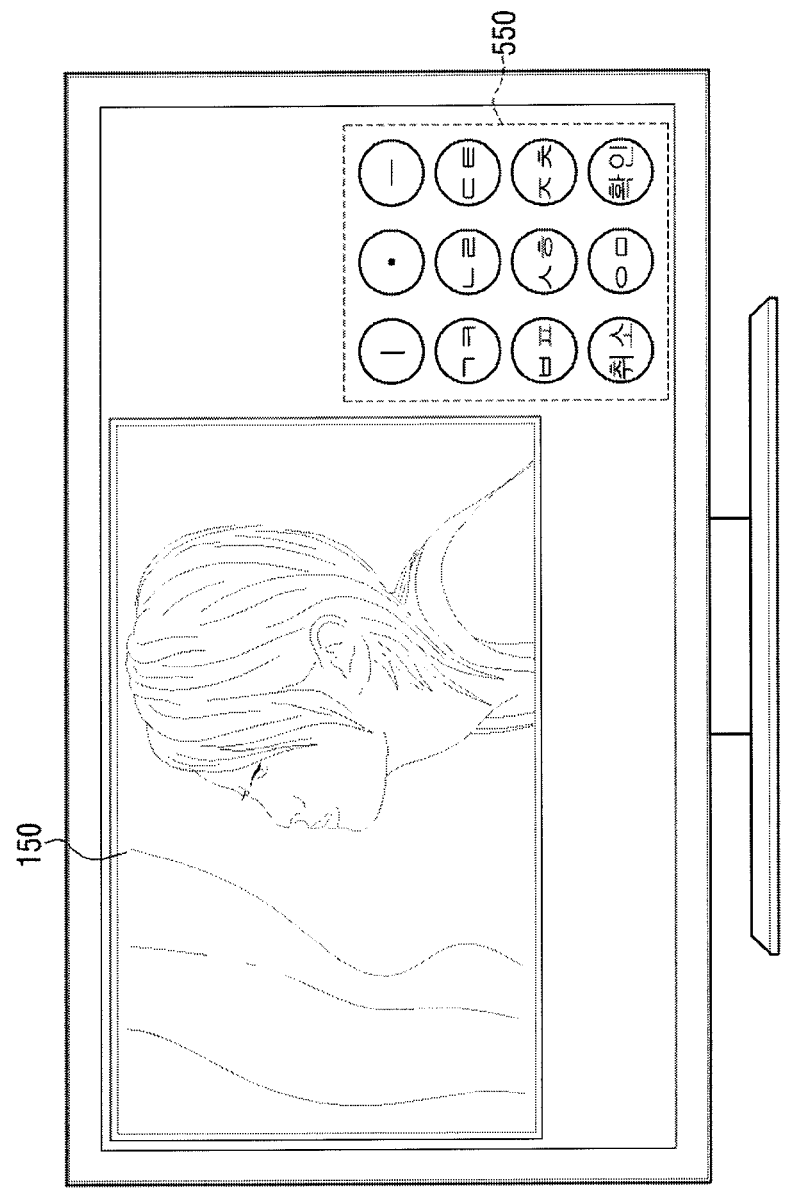
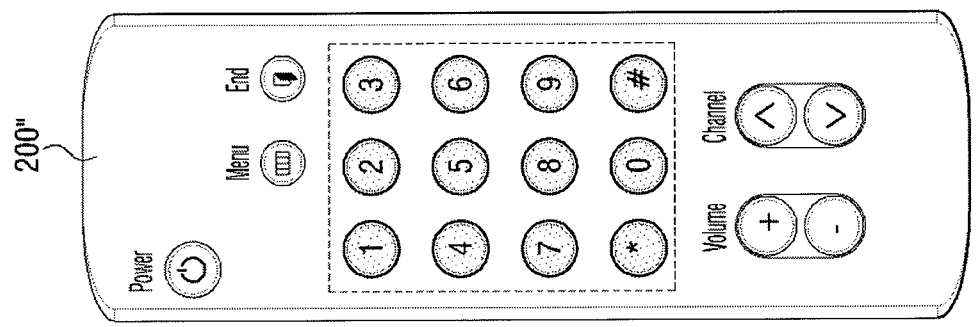

METHOD FOR INPUTTING USER COMMAND AND VIDEO APPARATUS EMPLOYING THE SAME

CROSS-REFERENCE TO RELATED APPLICATION

This application claims the benefit of Korean Application No. 2007-96087, filed Sep. 20, 2007, in the Korean Intellectual Property Office, the disclosure of which is incorporated herein by reference.

BACKGROUND OF THE INVENTION

1. Field of the Invention

Aspects of the present invention relate to a method of controlling a video apparatus and a video apparatus employing the same. More particularly, aspects of the present invention relate to a method of inputting a user command to a video apparatus and a video apparatus employing the same.

2. Description of the Related Art

The term "video apparatus," as used herein, refers to an apparatus that reproduces or records a broadcast, an image recorded on a recording medium, or an image transmitted from the outside. With the rapid development of video and broadcasting technologies, the video apparatus provides various types of content. In particular, due to the advent of digital television and internet television, which are types of video apparatuses, viewers enjoy a great selection of content through the television. Thus, the usefulness of inputting letters as well as numerals to search for specific content increases.

As a current prevailing method of inputting letters into a television, a wire/wireless keyboard or a remote controller provided with letter keys is used. However, the method requiring an extra keyboard to input letters causes an increased manufacturing cost. Also, when a user wishes to input letters while viewing the television, the user has to find the extra keyboard and mount it to the television, and thus the user may feel that it is inconvenient to input letters.

Also, if letter keys are added to a remote controller, the size of the remote controller becomes larger. Also, if the user inputs letters using the letter keys on the remote controller, the user is required to check whether the input letters are accurate through a television's display since it is difficult for the user to look at both the remote controller and the television concurrently. This also causes an inconvenience to the user.

SUMMARY OF THE INVENTION

Aspects of the present invention provide a method to input a user command, by displaying a navigation window corresponding to keys on a manipulation unit and thereby allows a user to more conveniently input a user command, and a video apparatus employing the same.

Additional aspects and utilities of the present invention will be set forth in part in the description which follows and, in part, will be obvious from the description, or may be learned by practice of the invention.

According to an embodiment of the present invention, there is provided an input apparatus to control a video apparatus, the input apparatus including a plurality of input keys, and an input mode converter to convert an input mode of the input keys. The input mode converter may convert an input mode of the input keys in order for the input keys to perform a navigation function according to a user's manipulation.

According to an aspect of the present invention, the input mode converter may be a mode conversion button to convert the input mode.

According to an aspect of the present invention, the input mode converter may be a mode conversion sensor to convert the input mode.

According to an aspect of the present invention, the input mode converter may be a touch sensor to convert the input mode.

According to another aspect of the present invention, there is provided an input apparatus to control a video apparatus, the input apparatus including a plurality of input keys, and an input mode converter to convert an input mode of the input keys. The input mode converter may convert an input mode of the input keys in order for the input keys to perform a letter inputting function according to a user's manipulation.

According to another embodiment of the present invention, there is provided a video apparatus to reproduce an image, including a display to display an image, a receiver to receive an input mode conversion signal to control the video apparatus from an input apparatus including a plurality of keys, and a controller to control such that navigation key symbols corresponding to specific keys of the input apparatus are displayed on the display according to the received input mode conversion signal.

According to another embodiment of the present invention, there is provided a video apparatus to reproduce an image, including a display to display an image, a receiver to receive an input mode conversion signal to control the video apparatus from an input apparatus including a plurality of keys, and a controller to control such that letter key symbols corresponding to specific keys of the input apparatus are displayed on the display according to the received input mode conversion signal.

According to another embodiment of the present invention, there is provided a method of controlling a video apparatus, the method including displaying a navigation window including letter key symbols corresponding to keys on a manipulator, if a first user command as to a specific key symbol on the manipulator is input, activating a specific letter key on the navigation window corresponding to the specific key, and, if a second user command as to the specific key is input, inputting a letter corresponding to the activated specific letter key symbol.

According to an aspect of the present invention, the first user command may be generated by touching the specific key, and the second user command may be generated by pressing the specific key.

According to an aspect of the present invention, the method may further include determining whether a touched area on the manipulator is continuous or not, and displaying the navigation window if it is determined that the touched area is not continuous.

According to an aspect of the present invention, the manipulator may be physically separated from the video apparatus.

According to another embodiment of the present invention, there is provided a method of controlling a video apparatus that includes a numeric mode in which a number is input and an alphabetic mode in which a letter is input, the method including determining whether the video apparatus is in the numeric mode or the alphabetic mode according to how a manipulator is held by a user, if the mode is the numeric mode and if a key of a specific number on the manipulator is selected, inputting the specific number, if the mode is the alphabetic mode, displaying a navigation window including letter key symbols corresponding to keys on the manipulator, and, if a specific key on the manipulator is selected, inputting a specific letter on the navigation window corresponding to the specific key.

According to an aspect of the present invention, the video apparatus may be determined to be in the numeric mode if the user holds the manipulator with one hand, and may be determined to be in the alphabetic mode if the user holds the manipulator with both hands.

According to another embodiment of the present invention, there is provided a video system including a manipulator provided with a plurality of keys, and a video apparatus including a display to display letter key symbols corresponding to the keys on the manipulator, and a controller which, if a first user command as to a specific key on the manipulator is input, activates a specific letter key symbol on the display corresponding to the specific key, and if a second command as to the specific key is input, inputs a letter corresponding to the activated specific letter key symbol.

According to an aspect of the present invention, the first user command may be generated by touching the specific key, and the second user command may be generated by pressing the specific key.

According to an aspect of the present invention, if a touched area of the manipulator is not continuous, the controller may control the display such that the letter key symbols are displayed on the display.

According to an aspect of the present invention, the manipulator may be physically separated from the video apparatus.

According to another embodiment of the present invention, there is provided a video system including a numeric mode in which a number is input and an alphabetic mode in which a letter is input, the video system including a manipulator through which a user command is input, and a video apparatus including a display to display a graphic user interface (GUI), and a controller to determine whether the video apparatus is in the numeric mode or the alphabetic mode according to how the manipulator is held by a user. If it is determined that the video apparatus is in the alphabetic mode, the controller may control such that a GUI including letter key symbols corresponding to keys on the manipulator is displayed on the display.

According to an aspect of the present invention, if the user holds the manipulator with one hand, the controller may determine that the video apparatus is in the numeric mode, and if the user holds the manipulator with both hands, the controller may determine that the video apparatus is in the alphabetic mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and utilities of the present invention will become apparent and more readily appreciated from the following description of the embodiments, taken in conjunction with the accompanying drawings of which:

FIGS. 5A to 5E are views illustrating a navigation window displayed in several modes of a broadcast receiving apparatus according to an embodiment of the present invention.

DETAILED DESCRIPTION OF THE EMBODIMENTS

Figure 1:
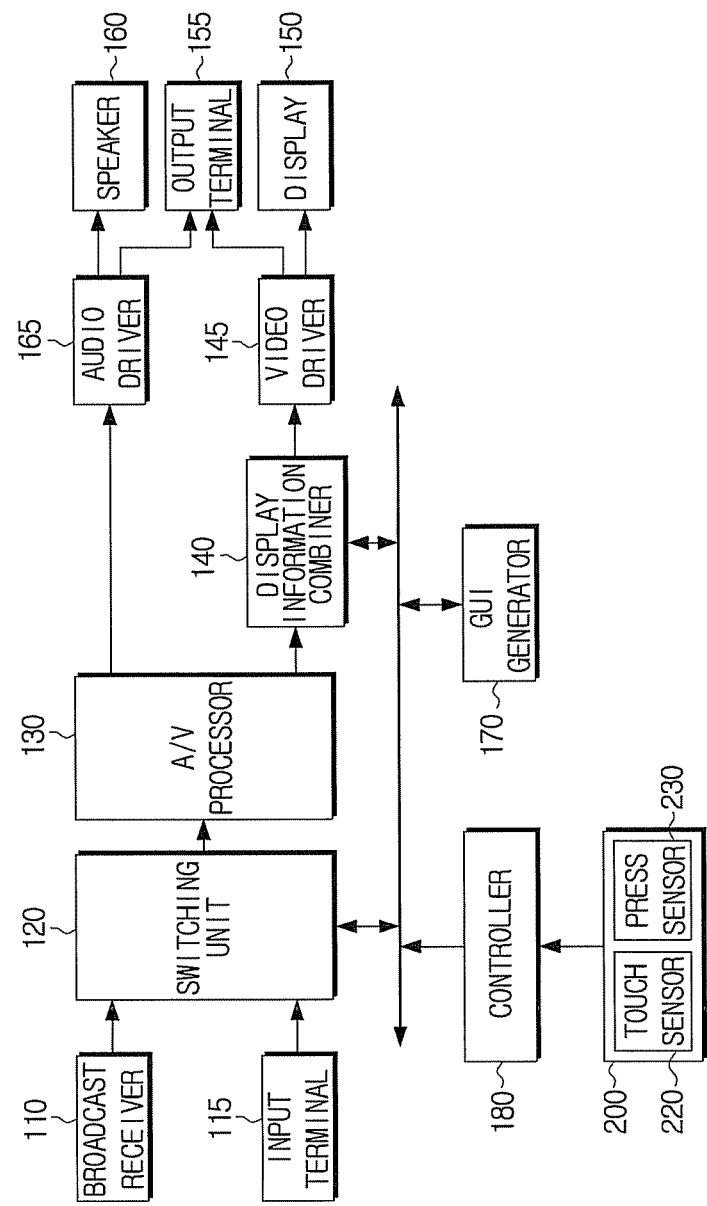
FIG. 1 is a block diagram illustrating a broadcast receiving apparatus according to an embodiment of the present invention.

Reference will now be made in detail to the embodiments of the present invention, examples of which are illustrated in the accompanying drawings, wherein like reference numerals refer to the like units throughout. The embodiments are described below in order to explain the present invention by referring to the figures.

FIG. 1 is a block diagram illustrating a broadcast receiving apparatus, which is a type of video apparatus, according to an embodiment of the present invention. As shown in FIG. 1, a broadcast receiving apparatus according to an embodiment of the present invention comprises a broadcast receiver 110, a input terminal 115, a switching unit 120, an A/V processor 130, a display information combiner 140, a video driver 145, a display 150, an output terminal 155, a speaker, an audio driver 165, a GUI (graphic user interface) generator 170, and a controller 180. A manipulator (such as, for example, a remote controller) 200 transmits user commands to the controller 180.

The broadcast receiver 110 tunes to a TV broadcast and demodulates it. The input terminal 115 provides a communication interface to communicably connect to an external device. The external device connected to the input terminal 115 may be, for example, a PC, a camera, a camcorder, a DVD player, a PMP, a HDD player, a USB memory stick, or a memory card. However, these are merely examples of the external device and any device that embeds therein a recording medium that records or stores an image may serve as an external device. Also, the input terminal 115 may be a communication interface that communicates with an external device of a content provider through the Internet. The input terminal 115 is connected to the external device via a wire or wirelessly.

The switching unit 120 performs a switching operation such that an output from the broadcast receiver 110 or the input terminal 115 is transmitted to the A/V processor 130. The switching unit 120 is controlled by the controller 180.

The display information combiner 140 combines a video signal output from the A/V processor 130 with output information such as letters, symbols, figures and graphics. The display information combiner 140 adopts an on screen display (OSD) method to combine the video signal with the output information. The display information combiner 140 is also controlled by the controller 180.

The video driver 145 outputs the video signal, which may be combined with display information by the display information combiner 140, to the display 150 or transmits it to another external device (not shown) through the output terminal 155.

The audio driver 165 outputs an audio signal output from the A/V processor 130 through the speaker 160, or transmits it to another external device (not shown) through the output terminal 155.

The GUI generator 170 generates a GUI corresponding to a mode of the broadcast receiving apparatus, and outputs the generated GUI to the display information combiner 140. In particular, the GUI generator 170 generates a GUI corresponding to a navigation window.

The navigation window is a GUI that displays a user command of high frequency on the display 150. The navigation window is useful in instances where it is not possible for a user to directly input a user command through a key provided on the manipulator 200, and in general, the type of navigation window that is automatically displayed may vary depending on a mode of the broadcast receiving apparatus.

According to an embodiment of the present invention, the mode of the broadcast receiving apparatus may be a numeric mode or an alphabetic mode. In the numeric mode, a user inputs a user command by using numerals. For example, the user inputs a broadcast channel number to view a specific broadcast. On the other hand, in the alphabetic mode, the user inputs a user command by using letters. For example, the alphabetic mode is used in text searching for a specific content or in instant messaging. As used herein, the terms "alphabetic" and "letter" are not limited to letters of the Roman alphabet, but may refer generally to characters used in any written language system.

The controller 180 controls the operation of the broadcast receiving apparatus based on a user command received from the manipulator 200, which will be described in detail below. More specifically, the controller 180 determines the mode of the broadcast receiving apparatus based on a user command input through the manipulator 200. The user touches the manipulator 200 to input a user command. The controller 180 determines that the broadcast receiving apparatus is in the numeric mode if a touched area of the manipulator 200 is continuous and determines that the broadcast receiving apparatus is in the alphabetic mode if a touched area of the manipulator 200 is not continuous. Also, the controller 180 controls several function blocks of the broadcast receiving apparatus to reproduce a specific content such as an image or a broadcast according to a user command input in the numeric mode and the alphabetic mode.

The manipulator 200 receives a user's manipulation command and transmits it to the controller 180. The manipulator 200 may be an integral type or a split type. Also, the manipulator 200 may be embodied as a user interface providing a menu display through which the user inputs a user command. Also, the manipulator 200 may be embodied as a remote controller through which the user inputs a user's manipulation command and a light receiver that receives an output signal from the remote controller and transmits the output signal to the controller 180. Hereinafter, the manipulator 200 will be described using examples of remote controllers 200' and 200", which are separated from the broadcast receiving apparatus and receive user's commands. It is to be understood that the manipulator 200 is not limited to these examples.

Figure 2:
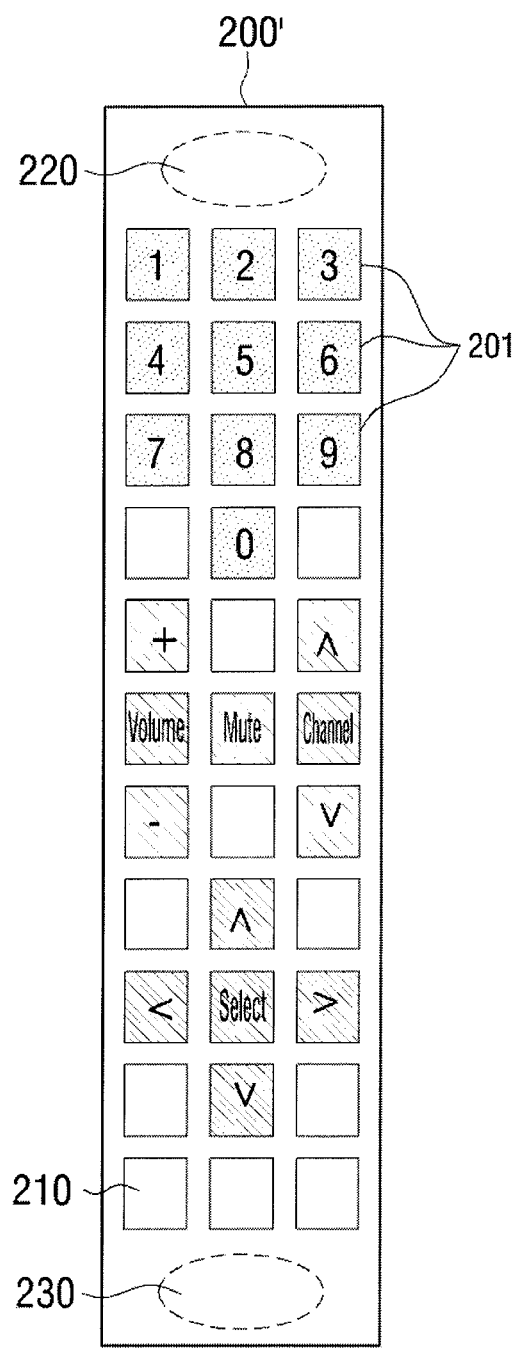
FIG. 2 is a view illustrating an exterior of a remote controller according to an embodiment of the present invention.

FIG. 2 is a view illustrating an exterior of the remote controller 200', which is a type of manipulator 200 according to an embodiment of the present invention. In particular, the remote controller 200' is provided with a plurality of keys 201 such as number keys, a Select key, volume keys, channel selector keys, etc. Each key 201 has a touch sensor and a press sensor. The touch sensor senses the touching of a key 201 by a user and applies a touch result to the controller 180. The press sensor senses the pressing of a key 201 by a user and applies a press result to the controller 180. Each key 201 has unique coordinate information such that the touch sensor and the press sensor may apply their unique coordinate information to the controller 180 along with the results. First and second touch sensors 220 and 230 may be also provided on a whole front surface or a part of the remote controller 200' in addition to having a touch sensor on each key. As described below, the first and second touch sensors 220 and 230 are used in determining the mode of the broadcast receiving apparatus.

The remote controller 200' is physically separated from the broadcast receiving apparatus and thus is provided with a sender (not shown) to send the touch result and the press result to the broadcast receiving apparatus. A receiver may be provided in the broadcast receiving apparatus to receive the touch result and the press result from the remote controller 200.

Figure 3:
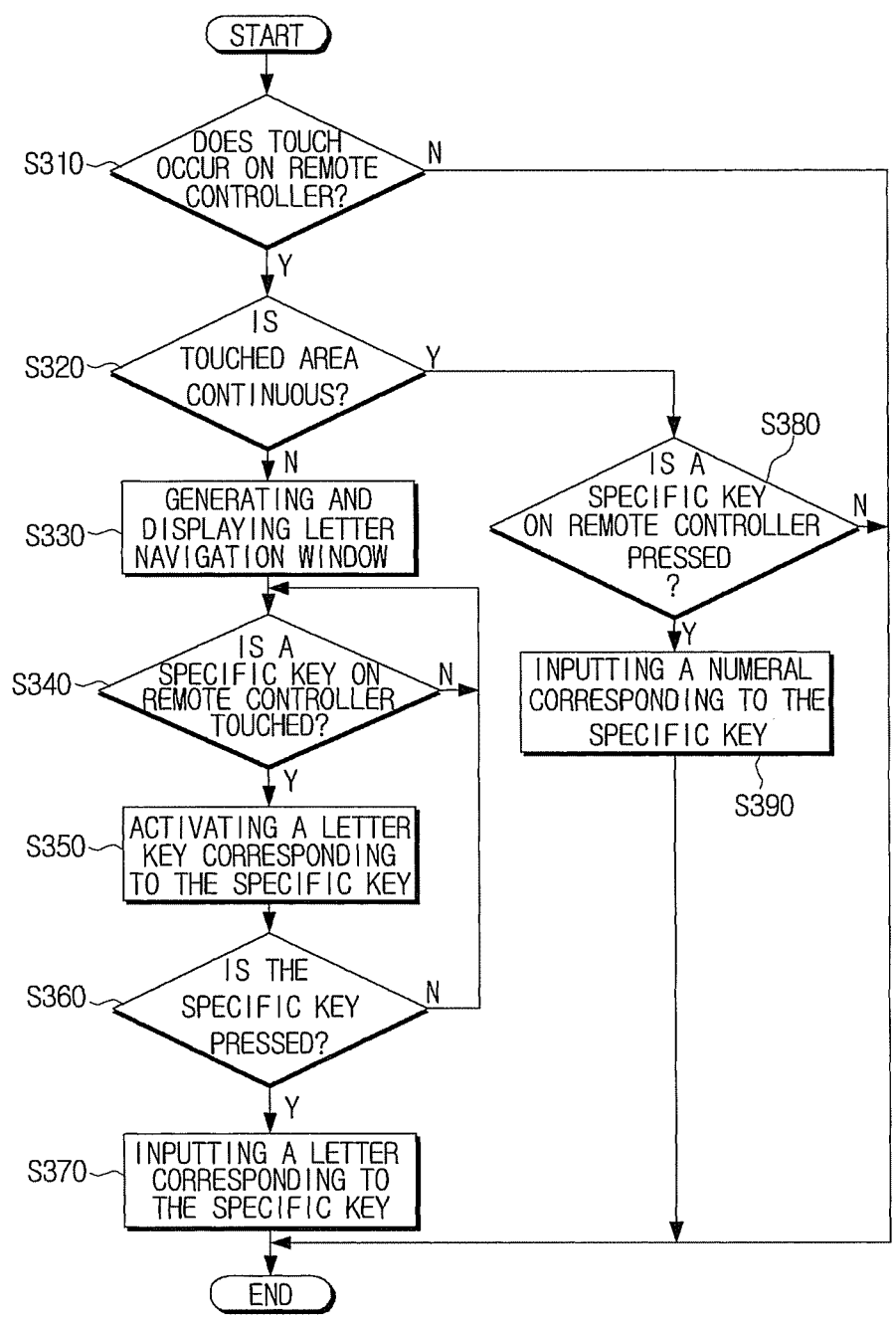
FIG. 3 is a flowchart illustrating processes of determining a mode and receiving a user command in a specific mode according to an embodiment of the present invention.

Hereinafter, processes of determining a mode and receiving a user command in a specific mode of the broadcast receiving apparatus of FIG. 1 will be described in detail with reference to FIG. 3. FIG. 3 is a flowchart illustrating processes of determining a mode and receiving a user command in a specific mode according to an exemplary embodiment of the present invention.

First, the controller 180 determines whether the remote controller 200' is touched or not (S310). More specifically, a user holds the remote controller 200' to input a user command. In order to input a user command, the user uses the keys 201 arranged on the front surface of the remote controller 200', and thus may touch a key 201 with the thumb when holding the remote controller 200'. Then, the touch sensor 220 arranged in a touched area transmits the touch result and coordinate information of the touch sensor 220 to the controller 180. The controller 180 determines that the remote controller 200' has been touched based on a signal applied from the remote controller 200'.

If it is determined that the remote controller 200' has been touched (S310-Y), the controller 180 determines whether the touched area of the remote controller 200 is continuous (S320), that is whether the remote controller 200' is touched in one contiguous area or is touched in separated areas, such as, for example, opposite ends of the controller 200'. For example, if the user holds the remote controller 200' with one hand, the user's thumb is brought into touch with a key 201 provided on the remote controller 200'. The area touched by the thumb is continuous and accordingly, the coordinate information received at the controller 180 from the remote controller 200 is continuous. However, if the user holds the remote controller 200 with both hands, the thumbs will generally touch different areas on the remote controller 200'. In this case, the touched areas would not be continuous and the coordinate information received at the controller 180 from the remote controller 200' would not be continuous.

If it is determined that the touched area on the remote controller 200' is not continuous (S320-N) (for example, if the user is holding the remote controller 200' with both hands), the controller 180 controls the GUI generator 170, the display information combiner 140, and the display 150 to display a GUI, which is a letter navigation window, on the display 150 (S330). That is, if the touched area on the remote controller 200' is not continuous, the controller 180 determines that the broadcast receiving apparatus is in an alphabetic mode. Then, the controller 180 applies a control signal to the GUI generator 170 to generate a letter navigation window. Then, the GUI generator 170 generates a letter navigation window (such as, for example, the letter navigation window 151 shown in FIGS. 4B-4E) using a GUI element stored in a storage unit. The letter navigation window 151 comprises a series of letter key symbols 152 and a letter input window 153. The letter key symbols 152 on the letter navigation window have a one-to-one correspondence to the keys on the remote controller 200'. That is, the coordinate information of letter key symbols 152 corresponds one-to-one to the coordinate information of keys arranged on the remote controller 200'. Moreover, the letter key symbols 152 may be configured to have the same general arrangement and appearance (such as shape, etc.) as the keys on the remote controller 200'. The GUI generator 170 transmits the generated letter navigation window 151 to the display information combiner 140, and the display information combiner 140 combines one area of an image applied from the A/V processor 130 with the letter navigation window 151 and transmits the combined image to the display 150. Therefore, the display 150 displays the letter navigation window 151, which may be superimposed on the image applied from the A/V processor 130. The letter navigation window 151 may also have symbols corresponding to function keys such as an "enter" key or space bar on the remote controller 200' that are not used as letter keys.

Meanwhile, the controller 180 determines whether a specific key 201 on the remote controller 200' is touched (S340). If the user touches a specific key 201 while holding the remote controller 200' with both hands, the touch sensor 220 disposed in a touched area transmits a touch result and its coordinate information to the controller 180.

If it is determined that a specific key 201 on the remote controller 200' is touched (S340—Y), the controller 180 controls such that a letter key symbol 152 corresponding to the specific key is activated and displayed on the display (S350). That is, the controller 180 controls the display information combiner 140 to activate a letter key symbol 152 having the same coordinate information as the specific key 201 on the remote controller 200', and the display information combiner 140 activates the specific letter key symbol 152. Also, the letter navigation window including the activated letter key symbol 152 is displayed on the display 150. In other words, the display 150 is controlled to provide a visual indication that a particular key 201 on the controller 200' has been touched. As non-limiting examples, the corresponding letter key symbol 152 displayed on the display 150 may be provided with a different color or brightness from other letter key symbols 152 on the letter navigation window 151 displayed on the display, may be highlighted or outlined, or may blink.

Then, the controller 180 determines whether the specific key 201 on the remote controller 200' is pressed (S360). The user looks at the letter key symbol 152 activated on the display 150, and if the user wishes to input the letter corresponding to the letter key symbol 152, the user presses the touched specific key 201 on the remote controller 200'. Then, the press sensor 230 of the specific key 201 on the remote controller 200' transmits a press result to the controller 180. The controller 180 controls the display information combiner 140 and the display 150 to display the letter corresponding to the specific letter key symbol 152 on the letter input window 153.

As described above, the user can input a letter by touching and pressing a specific key 201 provided on the remote controller 200'. The user touches a key 201 on the remote controller 200' such that a letter key symbol 152 corresponding to the touched key 201 on the remote controller 200' is activated on the display 150, and the user presses the key 201 such that a specific letter corresponding to the letter key symbol 152 is input into the letter input window 153. Therefore, the user can input a letter by simply looking at the letter key symbol 152 displayed on the display 150 without having to look at the remote controller 200' to check the key's location.

If it is determined that the touched area is continuous (S320-Y) (for example, if the user is holding the remote controller 200' with one hand), the controller 180 determines whether a specific key 201 on the remote controller 200' is pressed (S380). For example, the user can touch a specific key 201 on the remote controller 200' while holding the remote controller 200' with one hand. Then, the touch sensor 220 arranged in a touched area transmits the touch result to the controller 180, and the controller 180 determines that the touched area is continuous. That is, since the touched area is continuous, the controller 180 determines that the broadcast receiving apparatus is in a numeric mode. In the numeric mode, the controller 180 determines whether a press result is applied from the remote controller 200' to input a user command. In other words, the user presses the specific numeral key 201 provided on the remote controller 200' and the press sensor 230 of the specific numeral key 201 transmits the result to the controller 180 and then the controller 180 determines that the specific numeral key 201 is pressed. The controller 180 determines that a user command is input I corresponding to the specific numeral key 102 (S390). The letter navigation window 151 described above is not displayed in the numeric mode.

As described above, the broadcast receiving apparatus has different modes depending on whether the user holds the remote controller 200' with one hand or with both hands. Therefore, the remote controller 200' does not require an extra key to switch the mode. Also, if the broadcast receiving apparatus is in the alphabetic mode, the display 150 of the broadcast receiving apparatus automatically displays the letter navigation window 151 and thus allows the user to input a letter more conveniently without using a keyboard. Also, since letters are easy to input, the user is likely to use the broadcast receiving apparatus more frequently, since it is more convenient to search for specific content and Internet URLs, write emails, and send instant messages.

FIGS. 4A to 4E are views illustrating the display 150 and the remote controller 200' in the numeric mode (FIG. 4A) and the alphabetic mode (FIGS. 4B-4E) according to an embodiment of the present invention.

Figure 4A:
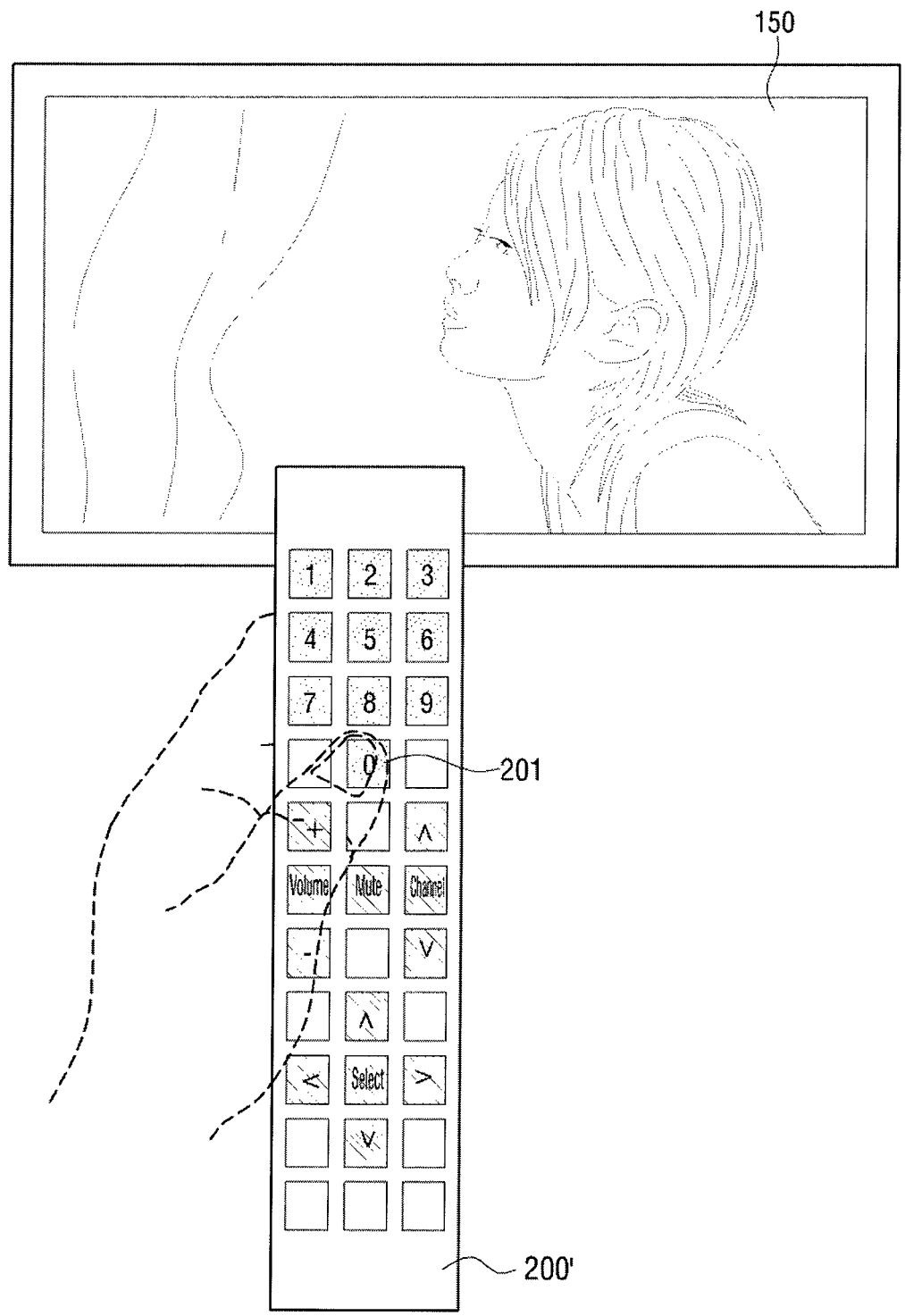
FIGS. 4A to 4E are views illustrating a display and a remote controller in a numeral mode and a letter mode according to an embodiment of the present invention.

FIG. 4A is a view illustrating the broadcast receiving apparatus in the numeric mode. In the numeric mode, a traditional way of using a remote controller is adopted. That is, the user holds the remote controller 200' using one hand. Typically, the remote controller 200' when held using one hand will be in an orientation such that its longest dimension is roughly parallel to a direction between the user and the display 150. If the user holds the remote controller 200' with one hand, the user's thumb may touch a specific key 201. In this case, a touched area is continuous and thus the controller 180 determines that the broadcast receiving apparatus is in the numeric mode. If the user presses a numeral key, a numeral corresponding to the key is input. If the user presses a volume "Up" or "Down" key to control the volume, the user command is input such that the volume of sound from the speaker 160 increases or decreases.

Figure 4B:
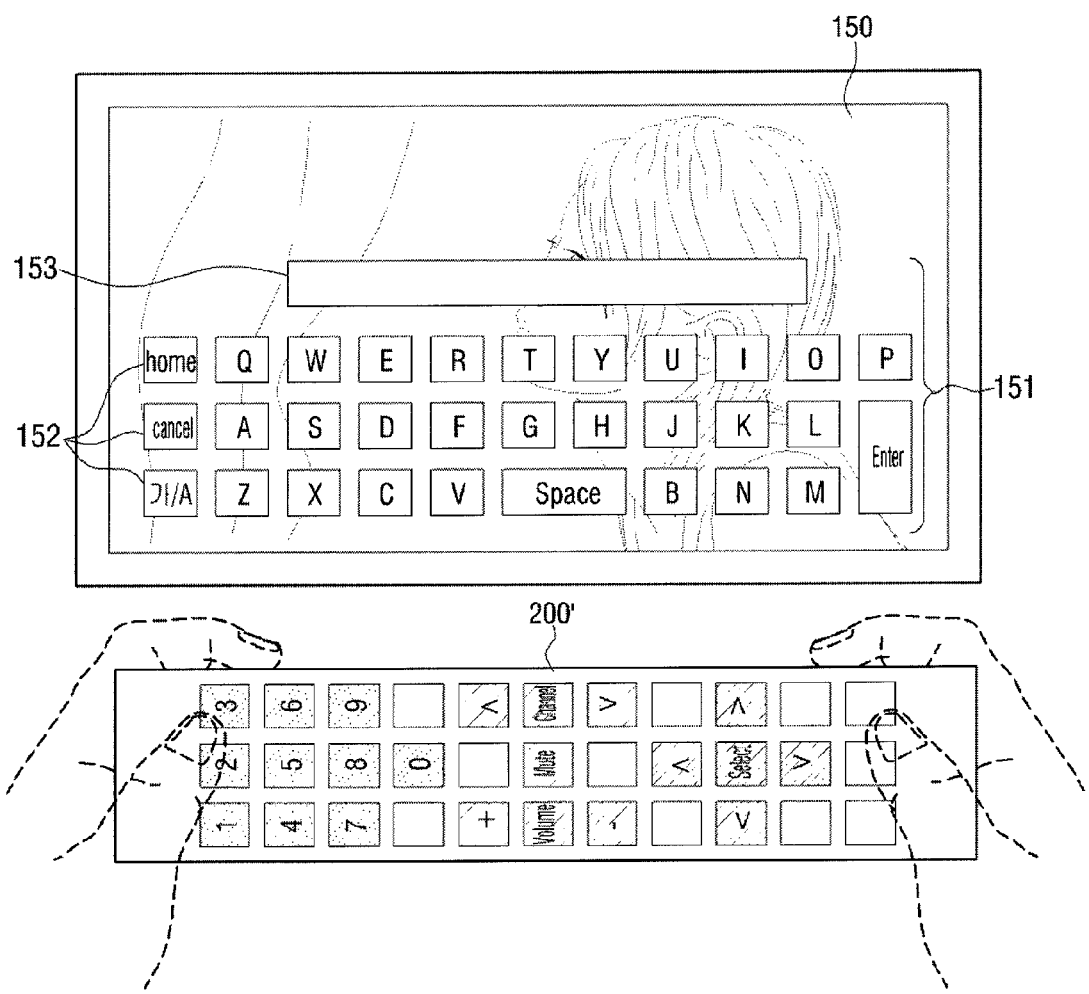

FIG. 4B is a view illustrating the broadcast receiving apparatus in the alphabetic mode. The user can hold the remote controller 200' using both hands such that two areas respectively are touched by the two thumbs of the user, respectively, and thus the touched areas are not continuous. Typically, the remote controller 200' when held using two hands will be in an orientation such that its longest dimension is roughly transverse to the direction between the user and the display 150. In this case, the controller 180 determines that the broadcast receiving apparatus is in the alphabetic mode and controls function blocks of the broadcast receiving apparatus to display the letter navigation window 151 on the display 150. FIG. 4B illustrates the remote controller 200' which is held by the user with both hands and shows an example of the letter navigation window 151 displayed on the display 150. Letter key symbols 152 displayed on the display 150 correspond to the keys 201 arranged on the remote controller 200. The letter key symbols 152 on the display 150 may have the same coordinate information as the keys 201 on the remote controller 200'. That is, the '3' key on the remote controller 200' has the same coordinate information as the 'Home' key symbol displayed on the display 150.

Figure 4C:
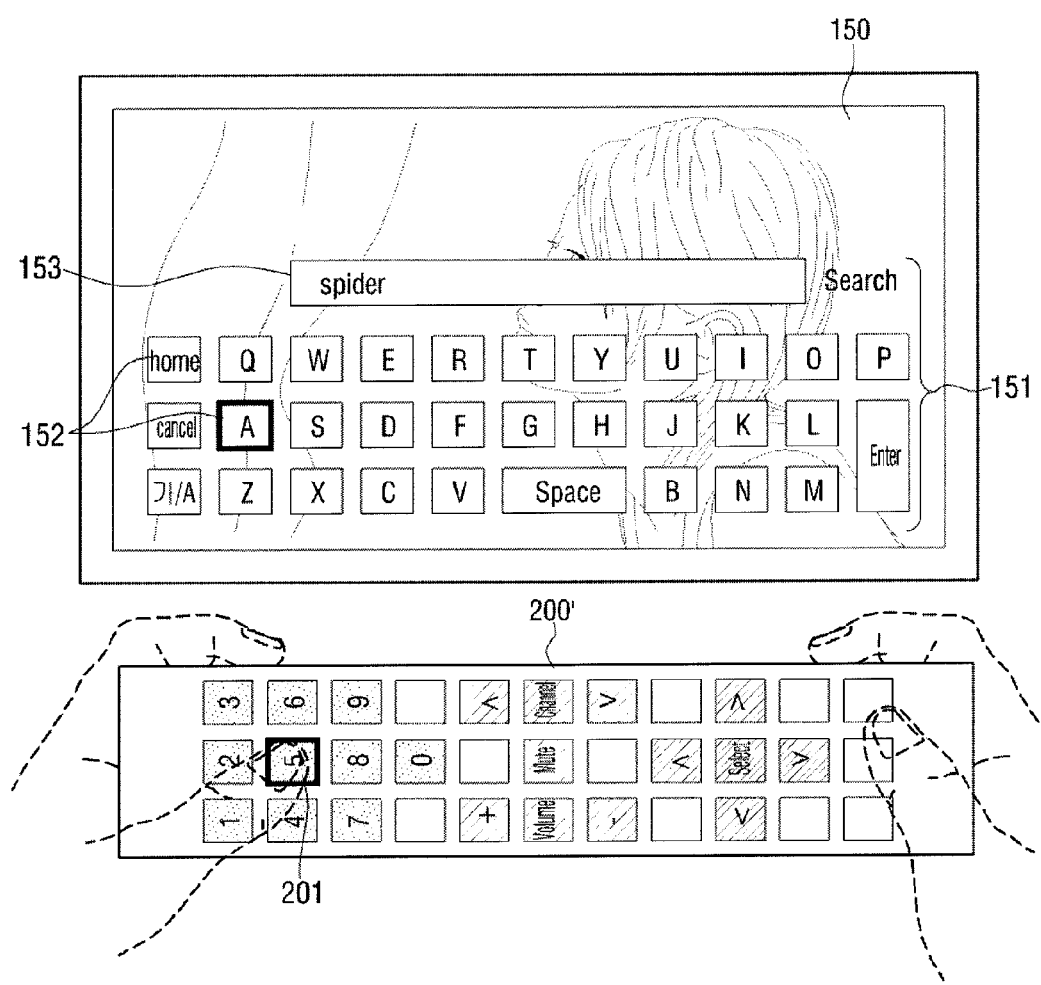
Figure 4D:
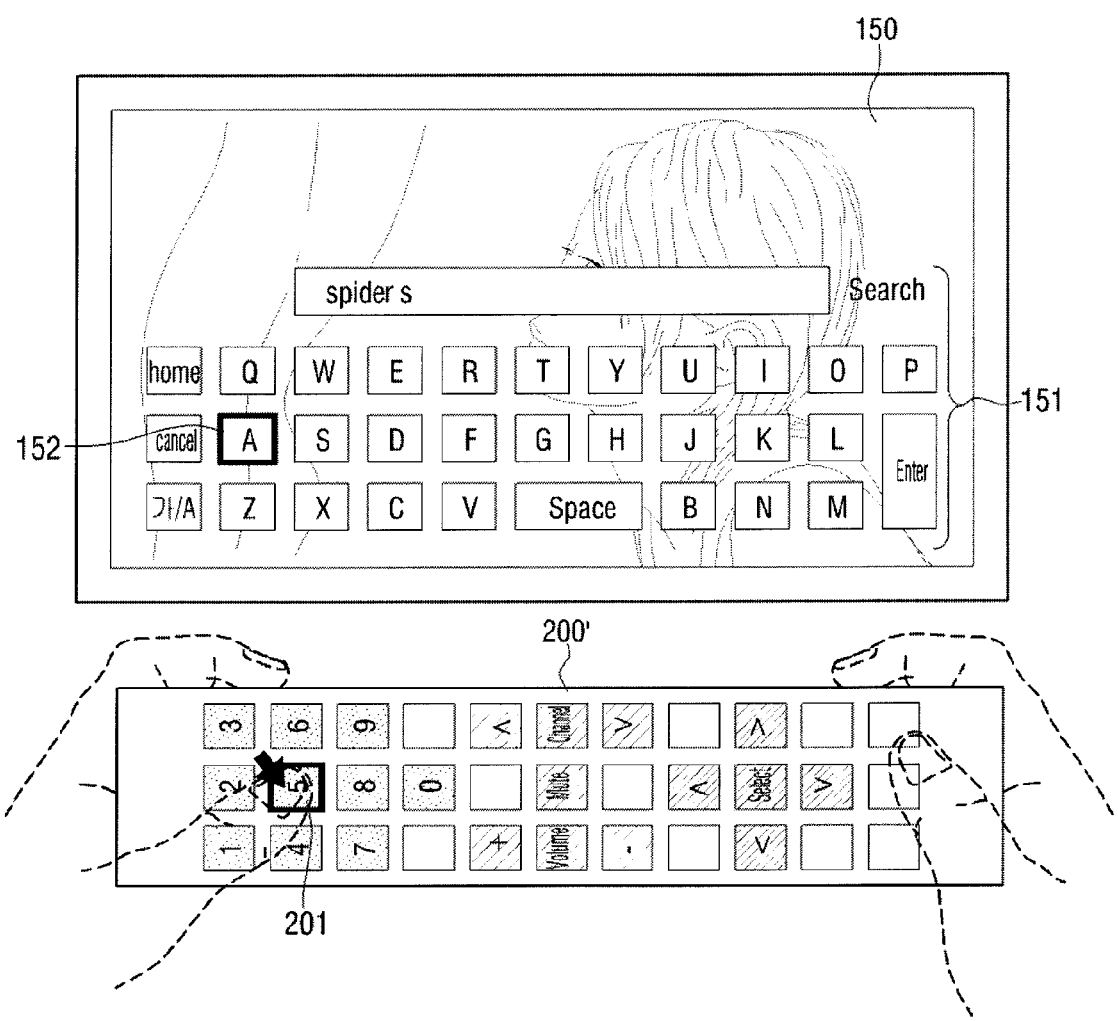

FIG. 4C illustrates the display 150 in which a specific key symbol 152 is activated in the alphabetic mode. If the user touches the '5' key on the remote controller 200' as shown in FIG. 4C, its corresponding letter key symbol 'A' is activated. FIG. 4D illustrates the display 150 in which a specific letter is input in the alphabetic mode. If the user presses the number key '5' on the remote controller 200', its corresponding letter 'A' is input into the letter input window 153, as shown in FIG. 4D.

Figure 4E:
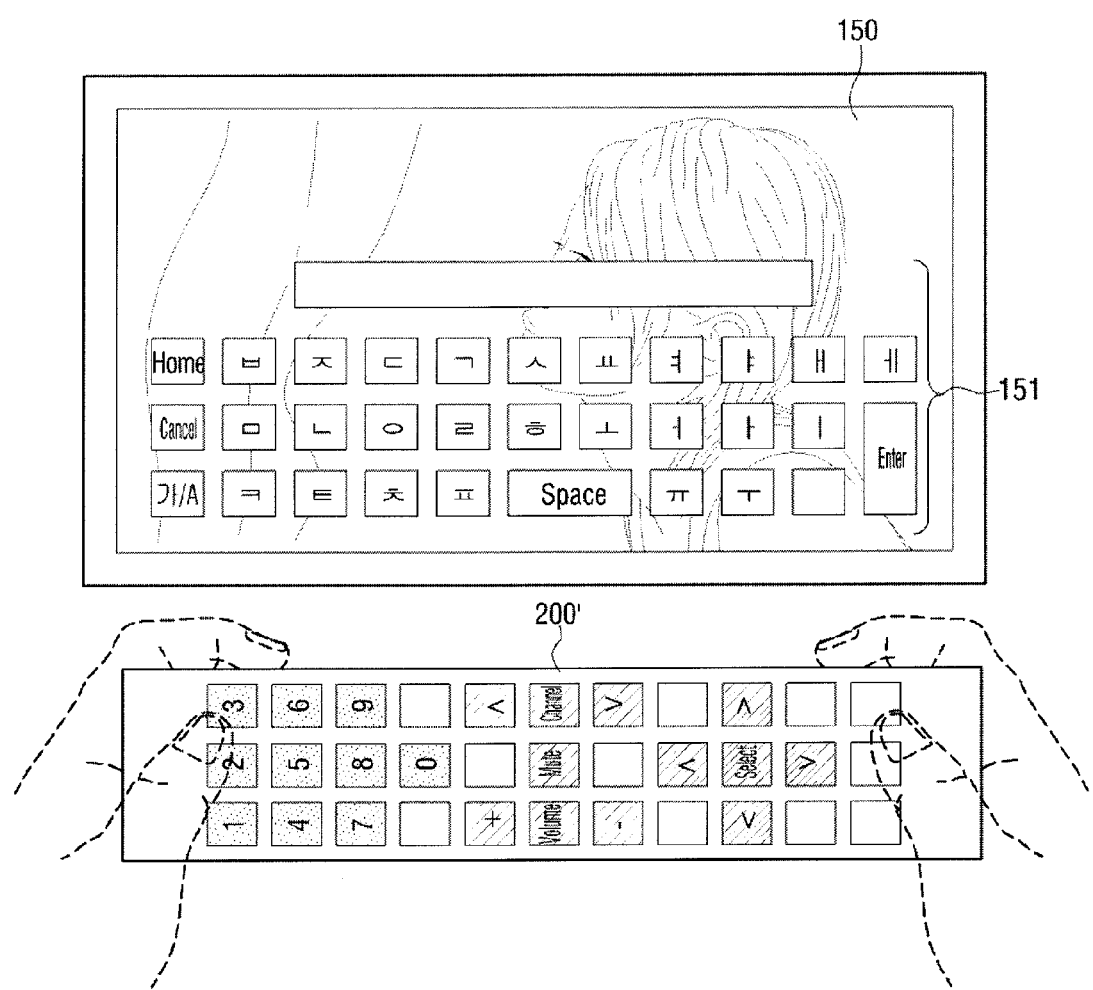

FIG. 4E illustrates the display 150 in a Korean alphabetic mode. In the Korean alphabetic mode, the letter navigation window 151 displays letter key symbols 152 corresponding to Korean letters, and the letters are input in the same way as in the English alphabetic mode.

As described above, the broadcast receiving apparatus switches its mode according to whether a touched area on a remote controller 200' is continuous or not, i.e., whether the user holds the remote controller 200' with one hand or both hands. However, it is to be understood that the broadcast receiving apparatus is not limited to the particular structures and methods described above. For example, a first interface may be provided on a first side of a remote controller that is the same as the remote controller 200' of FIG. 2 and a second interface may be provided on a second side of the remote controller. If the user holds this remote controller with the first interface facing up, a signal output from the first interface is firstly transmitted to the controller 180 and accordingly, the controller 180 determines that the broadcast receiving apparatus is in the numeric mode. If the user holds the remote controller with the second side facing up, a signal output from the second interface is firstly transmitted to the controller 180. In this case, the controller 180 determines that the broadcast receiving apparatus is in the alphabetic mode.

Also, in the embodiment described in FIGS. 2, 3 and 4A-4E, the touch sensor 220 on the remote controller 200' applies a touch result to the controller 180, and the controller 180 determines the mode of the broadcast receiving apparatus according to the touch result i.e. according to whether the touched area is continuous or not. However, it is to be understood that other structures and methods to determine the mode of the broadcast receiving apparatus may be used. For example, a specific button on the remote controller 200' may serve to convert the input mode, or a specific touch sensor on the remote controller 200' may serve to convert the input mode. Alternatively, other types of sensor on the remote controller 200' may serve to convert the input mode.

For example, a button 210 on the remote controller of FIG. 2 that is not used in the numeric mode may be used as a mode converting button. Also, first and second touch sensors 220 and 230, which are arranged at edges of the remote controller 200, may serve to convert the mode. For example, if at least one of the first and the second touch sensors 220 and 230 applies a touch result to the controller 180, the controller 180 converts the mode of the broadcast receiving apparatus into the alphabetic mode. Also, a sensor such as a gyro sensor may be provided in the remote controller 200' to output different results depending on whether the remote controller 200' is positioned as shown in FIG. 4A or is positioned as shown in FIG. 4B and thereby converts the input mode of the broadcast receiving apparatus. The specific button and the specific sensor such as gyro sensor or touch sensor for converting the input mode may all be referred to as an input mode converter. The user manipulates the input mode converter, such as pressing a key if the input mode converter is a key, touching a sensor if the input mode converter is a touch sensor, and changing the position of the remote controller if the input mode converter is a gyro sensor, thereby converting the input mode of keys in order for the keys on the remote controller 200' to perform a navigation function.

In this embodiment, a method for easily inputting letters using a limited number of keys on the remote controller 200' has been described. According to this embodiment of the present invention, the navigation window allows the user to input user commands more diversely in spite of the limited number of keys on the remote controller 200'.

FIGS. 5A to 5E are views of the display 150 and a remote controller 200" and showing navigation windows displayed on the broadcast receiving apparatus in several modes. FIG. 5A illustrates a navigation window and the remote controller 200" in a content search mode. As shown in FIG. 5A, if a plurality of content selections are displayed on the display 150 simultaneously, a search navigation window 510 is displayed on an area of the display 150. Also, the keys '2', '8', '4' and '6' on the remote controller 200" perform functions of 'Up (Λ)', 'Down (v)', 'Left (<)', and 'Right (>)'keys. Therefore, if the user touches the key '6' on the remote controller 200, the 'Right (>)' key symbol on the display 150 is activated, and if the user presses the key '6' on the remote controller 200, a cursor located on the left content moves to the right content.

FIG. 5B illustrates a reproduction navigation window in a reproduction mode. If the broadcast receiving apparatus reproduces a content selection as shown in FIG. 5B, the GUI generator 170 generates a reproduction navigation window 520 including key symbols representing functions frequently used in the reproduction mode, and displays the reproduction navigation window 520 on the display 150. The controller 180 determines that the keys '1' to '6' on the remote controller 200" serve to perform functions of 'Rewind (◄◄)' to 'Next (► l)' keys. If the user presses a number key on the remote controller 200", the controller 180 determines that a reproduction function corresponding to the number key, as indicated by the corresponding key symbol in the navigation window 520, is selected and controls function blocks to perform a corresponding function.

FIG. 5C illustrates an edit navigation window in a file edit mode. In the file edit mode, the display 150 displays an edit navigation window 530 including key symbols representing functions frequently used in the edit mode as shown in FIG. 5C. The controller 180 determines that the keys '1' to '6' on the remote controller 200" correspond to function keys "Open" to "Delete", as indicated by the corresponding key symbol in the navigation window 530, and receives a corresponding user command.

FIG. 5D illustrates a pen-style navigation window in a pen-style mode. The user may wish to use diverse formats in inputting letters. In order to satisfy the user's demand, the broadcast receiving apparatus may support a pen-style mode. If the broadcast receiving apparatus is in the pen-style mode, a pen-style navigation window 540 in which key symbols represent diverse pen styles is displayed on the display 150 as shown in FIG. 5D. Also, the keys '1' to '9' on the remote controller 200" are used to select pen-styles, as indicated by the corresponding key symbols having the same coordinate information in the navigation window 540.

FIG. 5E illustrates another example of the letter navigation window in a Korean letter mode. If the broadcast receiving apparatus is in a Korean letter mode, a letter navigation window 550 is displayed such that the user can input Korean letters simply using the number keys on the remote controller 200". The number keys on the remote controller 200" are used to input letters, as indicated by letter key symbols located in the same positions on the display 150. The same principle can be used to provide modes to input letters of the Roman alphabet or the alphabets of other languages.

Above, for a video apparatus capable of providing diverse contents, reproducing, searching, and editing a specific one of the contents, a method of manipulating the video apparatus more easily using a manipulator physically separated from the video apparatus has been described. Also, a broadcast receiving apparatus has been described as a video apparatus adopting this method. However, the broadcast receiving apparatus is merely an example for the convenience of explanation. There is no limitation in apparatuses to which the present invention is applicable. That is, the present invention may be applicable to a TV, a set-top box, a DVD replay apparatus, a DVD recording apparatus, a video cassette recorder (VCR), a multimedia replay apparatus, a motion picture replay apparatus, a compact disk (CD) replay apparatus, a CD recording apparatus, an MP3 player, a mobile phone, a personal digital assistant (PDA), or an audio system, and also to a combination video apparatus selectively integrating the above video and audio apparatuses.

As described above, even if the manipulator 200 is separated from the display 150 on which a result of touching or pressing keys of the manipulator 200 is displayed, the user can determine the location of keys to input a user command by simply looking the corresponding letter key symbols on the display 150.

In particular, letter key symbols corresponding to keys on the manipulator 200 are displayed on the display 150 of the video apparatus and are activated and letters or functions indicated by the letter key symbols are input by simply touching and pressing the corresponding keys on the manipulator 200. Therefore, the user can more conveniently input a user command using letters.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image apparatus for playing an image, the apparatus comprising:
   a display unit which displays an image;
   a communication unit which performs a communication with an input device having a plurality of keys; and
   a control unit which is configured to perform a first function corresponding to a first key in a first mode when a first key of the input device is pressed while the image apparatus maintains the first mode, to receive, through the communication unit, information on a second mode from the input device when an orientation of the input device is changed, to change a mode of the image apparatus to the second mode, and to perform a second function corresponding to a first key in the second mode when the first key of the input device is pressed while the image apparatus maintains the second mode,
   wherein the control unit controls the display unit to display a navigation window including a plurality of keys corresponding to the plurality of keys on the input device when the mode of the image apparatus is changed to the second mode.

2. The apparatus of claim 1, wherein the control unit configures a User Interface (UI) providing a navigation window including a plurality of keys corresponding to the plurality of keys on the input device.

3. The apparatus of claim 2, wherein the control unit configures the UI so as to include an indication of a function associated with a respective input key on the input apparatus.

4. The apparatus of claim 3, wherein the control unit configures the UI such that the function associated with a respective input key on the input apparatus is determined according to the orientation of the input apparatus.

5. The apparatus of claim 2, wherein the control unit configures the UI such that a layout of the plurality of keys of the navigation window are arranged similar to a layout of a plurality of input keys on the input apparatus.

6. The apparatus of claim 2, wherein the control unit configures the UI such that the navigation window provides a one-to-one correspondence of the plurality of keys provided in the navigation window to the plurality of keys on the input apparatus.

7. The apparatus of claim 1, wherein an input mode of the image apparatus for which an input may be inputted from the input apparatus to the image apparatus is associated with the orientation of the input apparatus.

8. The apparatus of claim 1, wherein when the orientation of the input apparatus is changed, the input apparatus communicates an indication of the change of the orientation to the image apparatus.

9. The apparatus of claim 8, wherein the indication of the change of orientation is generated based on a way by which a user holds the input apparatus.

10. The apparatus of claim 1, wherein the control unit configures a User Interface (UI) providing a navigation window including a plurality of keys corresponding to a subset of a plurality of keys on the input device the respective functions of which are variable based on an orientation of the input apparatus.

11. The apparatus of claim 1, wherein the plurality of keys corresponds to a plurality of virtual keys.

12. An image apparatus for playing an image, the apparatus comprising:
    a display unit which displays an image;
    a communication unit which performs a communication with an input device having a plurality of keys; and
    a control unit which is configured to perform the broadcasting image controlling function corresponding to the first key when a first key of the input device is pressed while the display unit displays a broadcasting image when an input device is in a first orientation, to perform a letter input function in which a letter input window is displayed on the broadcasting image when an orientation of the input device is changed to a second orientation, and to input a letter corresponding to the first key when the first key of the input device is pressed while the display unit displays the letter input window.

13. The apparatus of claim 12, wherein the letter input window includes a plurality of keys each corresponding to a respective one of a plurality of keys on the input device.

14. The apparatus of claim 13, wherein the layout of the plurality of keys of the letter input window indicates to a user of the input apparatus at least one of a letter and a function associated with one of the plurality of keys on the input device.

15. The apparatus of claim 13, wherein a layout of the plurality of keys of the letter input window are arranged similar to a layout of a plurality of input keys on the input apparatus.

16. The apparatus of claim 13, wherein the control unit configures the letter input window so as to provide a one-toone correspondence of the plurality of keys provided in the letter input window to the plurality of keys on the input apparatus.

17. The apparatus of claim 12, wherein the control unit configures a layout of a plurality of keys and functions respectively associated therewith based on the orientation of the input apparatus.

18. The apparatus of claim 12, wherein when the orientation of the input apparatus is changed, the input apparatus communicates an indication of the change of the orientation to the image apparatus.

19. The apparatus of claim 18, wherein the indication of the change of orientation is generated based on a way by which a user holds the input apparatus.

20. The apparatus of claim 12, wherein the control unit configures an operation of the image apparatus corresponding to received information that is indicative of which of a subset of the plurality of keys on the input device, for which an associated function is variable, was selected according to an orientation of the input apparatus.

21. The apparatus of claim 20, wherein the letter input window includes a plurality of keys corresponding to the subset of a plurality of keys on the input device the respective functions of which are variable based on an orientation of the input apparatus.

22. The apparatus of claim 12, wherein the plurality of keys corresponds to a plurality of virtual keys.

* * * * *